(12) United States Patent
Park et al.

(10) Patent No.: US 11,327,968 B2
(45) Date of Patent: May 10, 2022

(54) OPTIMIZING OUTPUT DATA FORMATS TO IMPROVE QUERY PERFORMANCE IN DATABASE SYSTEMS

(71) Applicant: SAP SE, Walldorf (DE)

(72) Inventors: Dan Bi Park, Seoul (KR); Jung Kook Lee, Vancouver (CA); Sung Heun Wi, West Vancouver (CA); Sang Il Song, Kirkland, WA (US)

(73) Assignee: SAP SE, Walldorf (DE)

( * ) Notice: Subject to any disclaimer, the term of this patent is extended or adjusted under 35 U.S.C. 154(b) by 106 days.

(21) Appl. No.: 16/838,121

(22) Filed: Apr. 2, 2020

(65) Prior Publication Data

US 2021/0311944 A1 Oct. 7, 2021

(51) Int. Cl.
*G06F 16/00* (2019.01)
*G06F 16/2453* (2019.01)

(52) U.S. Cl.
CPC .............. *G06F 16/24542* (2019.01)

(58) Field of Classification Search
None
See application file for complete search history.

(56) References Cited

U.S. PATENT DOCUMENTS

| | | | | |
|---|---|---|---|---|
| 6,330,552 | B1 * | 12/2001 | Farrar | G06Q 10/04 705/400 |
| 2007/0050328 | A1 * | 3/2007 | Li | G06F 16/9032 |
| 2007/0067274 | A1 * | 3/2007 | Han | G06F 16/2456 |
| 2012/0173515 | A1 * | 7/2012 | Jeong | G06F 16/258 707/718 |
| 2014/0317085 | A1 * | 10/2014 | Wehrmeister | G06F 16/24544 707/714 |
| 2014/0317088 | A1 * | 10/2014 | Al-Omari | G06F 16/24542 707/718 |
| 2015/0324432 | A1 * | 11/2015 | Gangloor | G06F 16/2455 707/718 |
| 2016/0292230 | A1 * | 10/2016 | Simitsis | G06F 16/2455 |
| 2021/0191942 | A1 * | 6/2021 | Arnold | G06F 16/24542 |

OTHER PUBLICATIONS

U.S. Appl. No. 16/371,276, Merx et al., Selectively Allowing Query Optimization in Query Processing, filed on Apr. 1, 2019, 29 pages.

* cited by examiner

*Primary Examiner* — Augustine K. Obisesan
(74) *Attorney, Agent, or Firm* — Fish & Richardson P.C.

(57) ABSTRACT

Methods, systems, and computer-readable storage media for calculating, for each operator in a set of operators, a set of costs, each cost associated with a data format and including a first segment indicating a cost of an operator to convert an incoming data format to an access format and a second segment indicating a cost based on a set of costs of one or more ancestors of the operator, a conversion cost, and a materialization cost, indicating, along the path within the query plan, a location representing execution of a conversion from a first data format to a second data format, the location being selected based on the sets of costs, and providing the query plan with the location for execution to generate a query result, wherein during execution of the query plan, conversion of data from the first data format to the second data format occurs at the location.

17 Claims, 7 Drawing Sheets

US 11,327,968 B2

OPTIMIZING OUTPUT DATA FORMATS TO IMPROVE QUERY PERFORMANCE IN DATABASE SYSTEMS

BACKGROUND

Enterprises leverage database systems to store and access data, and, often, significant amounts of data. Some database systems store thousands to millions of records that are frequently accessed. For example, transactions can be repeatedly executed to access and/or manipulate data stored within a database system. In some examples, transactions include queries that are issued to the database system by clients (e.g., users, applications). Queries can be received as query statements written in a query language (e.g., structured query language (SQL)).

Some database systems include a query execution engine that processes received queries to provide query results. A query can be processed to provide a query plan, or query execution plan (QEP), which can be described as a set of operators that are to be executed to provide a query result. In some database systems, query plans are optimized to improve execution performance within the database system in terms of time (e.g., time required to execute a transaction and provide a result) and technical resources (e.g., processing power, memory). For example, a database system can handle hundreds to thousands of transactions per second, which has a significant impact on the underlying resources of the database system.

SUMMARY

Implementations of the present disclosure are directed to optimizing query performance in database systems. More particularly, implementations of the present disclosure are directed to optimizing output data formats between operators of query plans to improve query performance in database systems.

In some implementations, actions include receiving a query plan, the query plan including at least one set of operators defining a path within the query plan, the path corresponding to a field of a table stored within the database system, calculating, for each operator in the set of operators, a set of costs, each cost in the set of costs associated with a data format in a set of data formats, each cost including a first segment and a second segment, the first segment indicating a cost of a respective operator to convert an incoming data format to an access format of the respective operator, the second segment indicating a cost based on a set of costs of a parent operator of the respective operator, a conversion cost, and a materialization cost, indicating, along the path within the query plan, a first location representing execution of a conversion from a first data format to a second data format, the first location being between a pair of operators selected based on the sets of costs, and providing the query plan with first location for execution to generate a query result, wherein during execution of the query plan, conversion of data from the first data format to the second data format occurs at the first location. Other implementations of this aspect include corresponding systems, apparatus, and computer programs, configured to perform the actions of the methods, encoded on computer storage devices.

These and other implementations can each optionally include one or more of the following features: the conversion cost represents processing power expended to convert a data record from the incoming data format to another data format; the materialization cost represents processing power required to store a data record as part of converting the data record from the incoming data format to another data format; the set of operators has an order of operators including an output operator that provides the query result and an input operator that reads data from the field of the table, the output operator being a first operator in the order of operators and the input operator being a last operator in the order of operators, and calculating the sets of costs begins with the output operator and ends with the input operator; each of the conversion costs and the materialization costs are provided as empirical values determined for the database system; actions further include indicating a second location representing execution of a conversion from the second data format to a third data format; and the second location is after an output operator of the set of operators.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
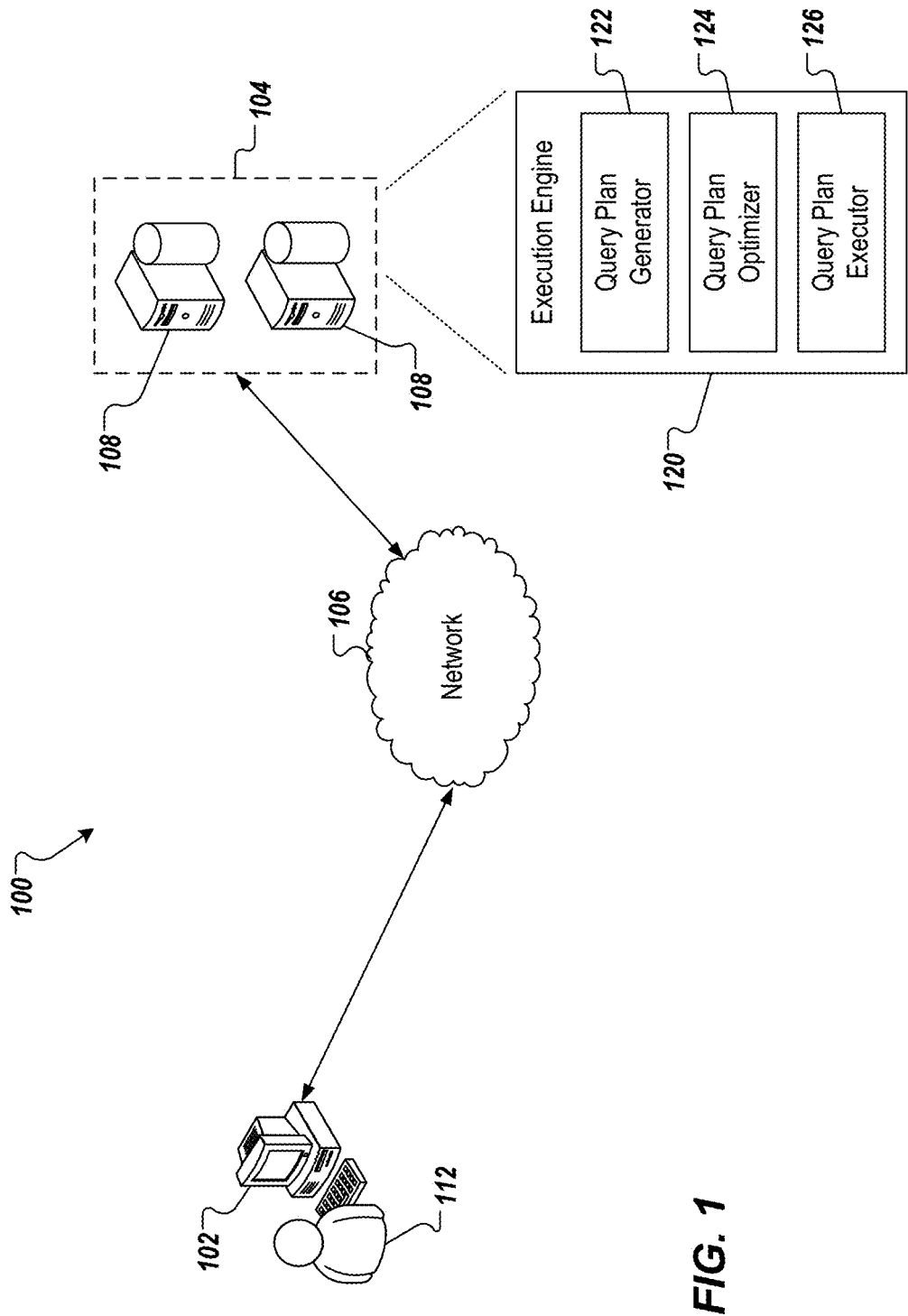
FIG. 1 depicts an example architecture that can be used to execute implementations of the present disclosure.

Implementations of the present disclosure are directed to optimizing query performance in database systems. More particularly, implementations of the present disclosure are directed to optimizing output data formats between operators of query plans to improve query performance in database systems. Implementations can include actions of receiving a query plan, the query plan including at least one set of operators defining a path within the query plan, the path corresponding to a field of a table stored within the database system, calculating, for each operator in the set of operators, a set of costs, each cost in the set of costs associated with a data format in a set of data formats, each cost including a first segment and a second segment, the first segment indicating a cost of a respective operator to convert an incoming data format to an access format of the respective operator, the second segment indicating a cost based on a set of costs of a parent operator of the respective operator, a conversion cost, and a materialization cost, indicating, along the path within the query plan, a first location representing execution of a conversion from a first data format to a second data format, the first location being between a pair of operators selected based on the sets of costs, and providing the query plan with first location for execution to generate a query result, wherein during execution of the query plan, conversion of data from the first data format to the second data format occurs at the first location.

Implementations of the present disclosure are described in further detail with reference to an example database system. The example database system is provided as the SAP HANA in-memory database system provided by SAP SE of Walldorf, Germany. SAP HANA can be described as a data platform that processes transactions and analytics at the same time on any data type, with built-in advanced analytics and multi-model data processing engines. More particularly, SAP HANA is an in-memory database system. In some examples, an in-memory database system can be described as a database system that uses main memory for data storage. In some examples, main memory includes random access memory (RAM) that communicates with one or more processors (e.g., central processing units (CPUs)), over a memory bus. An memory database can be contrasted with database management systems that employ a disk storage mechanism. In some examples, in-memory databases are faster than disk storage databases, because internal optimization algorithms can be simpler and execute fewer CPU instructions (e.g., require reduced CPU consumption). In some examples, accessing data in an in-memory database eliminates seek time when querying the data, which provides faster and more predictable performance than disk-storage databases. While SAP HANA is used as an example herein, it is contemplated, however, that implementations of the present disclosure can be realized in any appropriate database system.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In accordance with implementations of the present disclosure, and as noted above, the server system 104 can host a database system (e.g., SAP HANA). In some examples, the database system includes an execution engine 120 that processes received queries (e.g., one or more query statements) to provide query results. In some examples, the execution engine 120 includes a query plan generator 122, a query plan optimizer 124, and a query plan executor 126. The query plan generator 122 processes a query to provide a query plan. In some examples, and as described in further detail herein, the query plan is an ordered set of operators for accessing data in one or more tables of the database, processing the data, and providing the query result.

In some examples, the query plan optimizer 124 adjusts the query plan provided from the query plan generator 122 to improve performance of execution of the query plan (e.g., improve speed and/or efficiency of query plan). An example of query plan optimization can include adjusting order of operators to improve query performance. In accordance with implementations of the present disclosure, the query plan optimizer 124 can further optimize query plans by determining locations within the query plans for data format conversions to occur, as described herein. In this manner, a query plan can be further optimized to reduce burden on resources in execution of the data format conversions.

To provide further context for implementations of the present disclosure, and as introduced above, enterprises leverage database systems to store and access data, and, often, significant amounts of data. Some database systems store thousands to millions of records that are frequently accessed. For example, transactions can be repeatedly executed to access and/or manipulate data stored within a database system. In some examples, transactions include queries that are issued to the database system by clients (e.g., users, applications). Queries can be received as query statements written in a query language (e.g., structured query language (SQL)).

Some database systems include a query execution engine that processes received queries to provide query results. A query can be processed to provide a query plan, or query execution plan (QEP), which can be described as a set of operators that are to be executed to provide a query result. In some database systems, query plans are optimized to improve execution performance within the database system in terms of time (e.g., time required to execute a transaction and provide a result) and technical resources (e.g., processing power, memory). For example, a database system can handle hundreds to thousands of transactions per second, which has a significant impact on the underlying resources of the database system.

Within a database system, data is stored in conformance with a data structure scheme that can define multiple data formats. The data structure scheme enables data to be compressed within the database system to reduce the amount of memory consumed. During execution of a query plan, data can be converted between data formats, which can significantly impact query performance. That is, conversion of data between data formats not only takes time, impacting transaction execution time, but also consumes processing power and memory.

Figure 2:
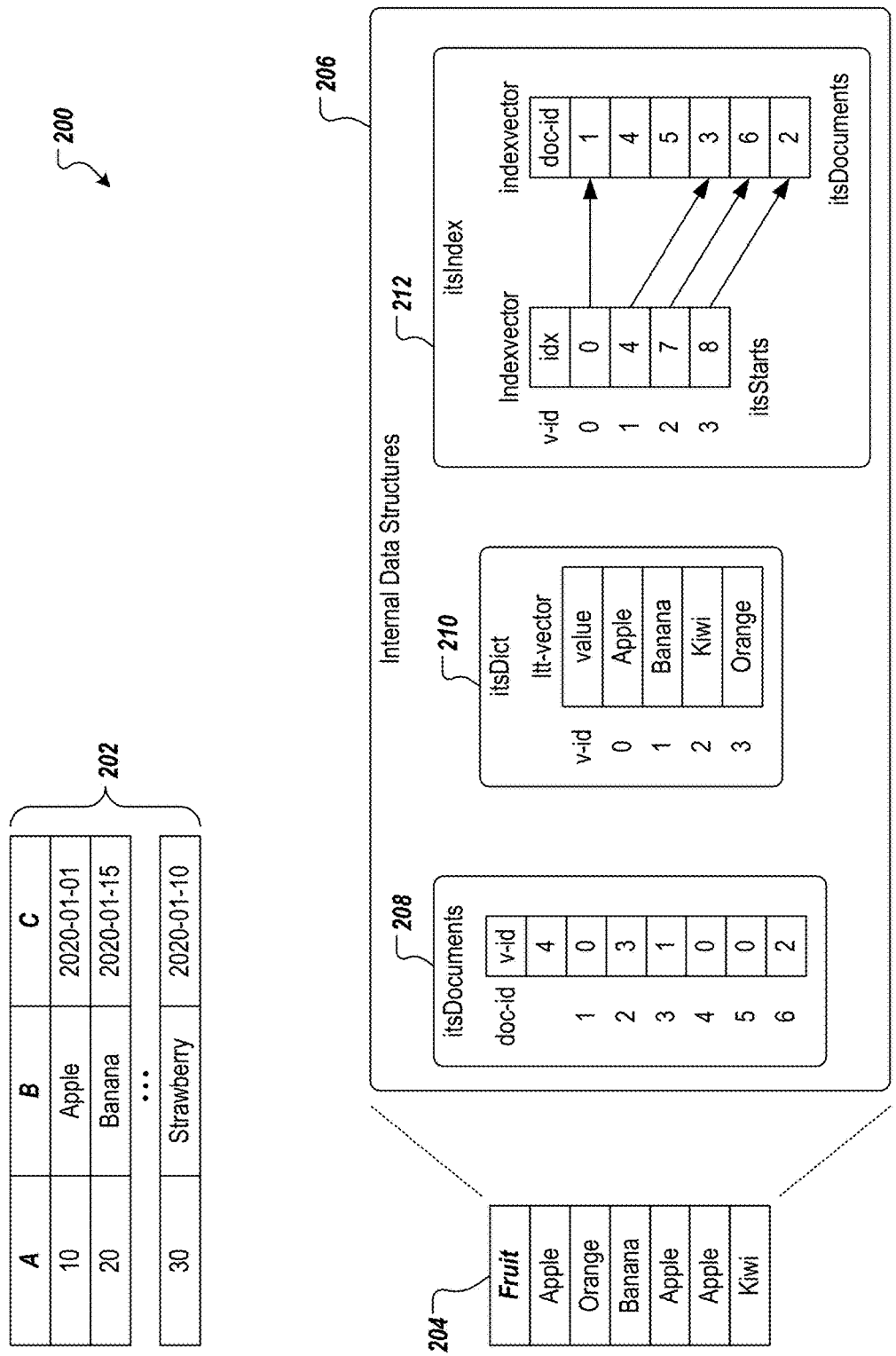
FIG. 2 depicts a graphical representation of example data structures for storing data in an example database system.

FIG. 2 depicts a graphical representation 200 of example data structures for storing data in an example database system. In the example of FIG. 2, an example table 202 is depicted and includes columns A, B, C. For example, column B is populated with various fruits. Data is accessed within the database system through multiple data formats. For example, a set of values can be defined within a table (e.g., a column of a table). In some examples, each record in the table can be referenced using a unique document identifier (doc-id). Using fruits as a non-limiting example, and as depicted in FIG. 2, a table 204 can be provided (e.g., a single-column table) and has values that are accessed within the database system through the set of data formats. For example, the table 204 corresponds to a column of a table (e.g., column B of the table 202) with a field [fruits] and respective values [apple, orange, banana, apple, apple, kiwi].

In the example of FIG. 2, the set of data formats include value, value identifier (v-id), and doc-id. In some examples, internal data structures 206 of the database system define relationships between the data formats for respective values. In the example of FIG. 2, a data structure 208 provides an internal (to the database system) representation of the table 204. For example, the doc-ids [1, 2, 3, 4, 5, 6] represent the records (rows) of the table 204, and the v-ids [0, 3, 1, 0, 0, 2] represent the values that populate the table 204. In the example of FIG. 2, the data structure 210 provides a relationship between values and respective v-ids. In this example, the value [apple] is assigned a v-id of 0, the value [banana] is assigned a v-id of 1, the value [kiwi] is assigned a v-id of 2, and the value [orange] is assigned a v-id of 3. In some examples, the data structure 212 (Index) can be optionally created for accelerating query execution performance. It allows direct doc-id lookup with given v-id. For example, if a query includes a filter condition with "fruit=Apple," an index with v-id=0 (Apple) can be looked up and the doc-id set having v-id=0 (e.g., doc-id=1, 4, 5).

In some examples, one or more of the data structures 208, 210, 212 are compressed within the database system. In this manner, resources (e.g., memory) are conserved. However, and as discussed in further detail herein, one or more of the data structures 208, 210, 212 are decompressed during execution of a query plan to enable conversion between data formats. Decompression of a data structure has an adverse impact on resources of the database system. For example, processing power is consumed to decompress the data structure and memory is consumed to store the decompressed information.

When a query plan is executed within the database system conversion between multiple data formats is required. For example, an initial operator can access data directly from a table based on doc-id, in which values are stored as respective v-ids, while a final operator outputs the query result using values. Consequently, somewhere along the path of executing the query plan, the data format needs to be converted.

Figure 3:
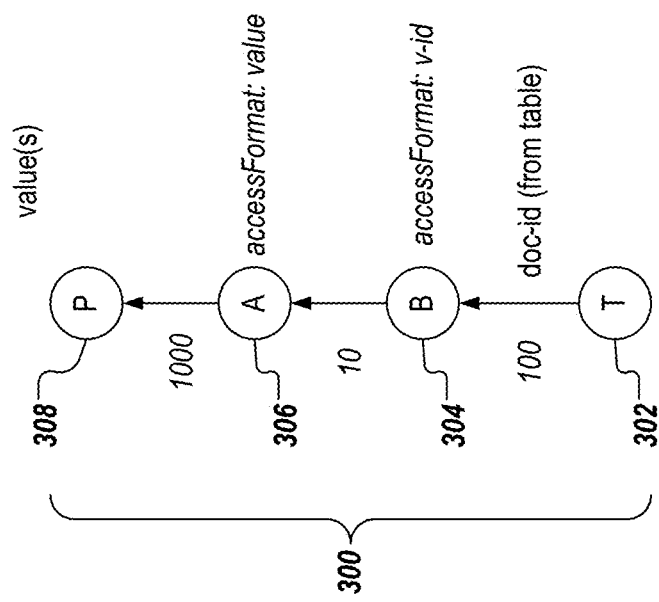
FIG. 3 depicts a graphical representation of an example query plan.

FIG. 3 depicts a graphical representation of an example query plan 300 that operates on a table. As introduced above, a query can be received as a query statement written in a query language (e.g., SQL). The query statement is converted (e.g., by the query plan generator of FIG. 1) to a query plan. In some examples, the query plan is optimized (e.g., by the query plan optimizer of FIG. 1) to improve performance in executing the query plan within the database system (e.g., reduce transaction time, reduce amount of resources consumed to execute the query plan). A traditional technique for optimization can include, for example, changing an order of the operators.

In the example of FIG. 3, the query plan 300 includes operators 302, 304, 306, 308. The query plan 300 is depicted as a tree (also referred to as a query tree) with each operator 302, 304, 306, 308 represented as a node and edges are provided between the nodes. The values between the operators 302, 304, 306, 308 (e.g., 100, 10, 1000) represent respective numbers of records output. Within the query plan 300, operators can be referenced as child operators and/or parent operators. For example, the operator 308 can be referred to as a parent of the operator 306 and the operator 306 can be referred to as a child of the operator 308. The operator 308, however, is not a child operator to any other operator. Also, the operator 302 is not a parent operator to any other operator.

The operator 302 can be referred to as an initial operator, which access the table 302. For example, the operator 302 can be provided as a table search operator that reads records of a field of a table and provides a set of doc-ids (e.g., 100 doc-ids) to the operator 304. Further, the operator 308 can be referred to as a final operator that outputs data from the table 302 as values. Accordingly, somewhere during execution of the query plan 300, at least two data format conversions are executed to change from doc-id to value in the query result. For example, a first data format conversion from doc-id to v-id, and a second data format conversion from v-id to value.

With continued reference to FIG. 3, each operator within a query plan has a respective access formats (accessFormat), which indicates the data format that the operator uses to perform its operation. In the example of FIG. 3, the operator 304 has an access format of v-id and the operator 306 has an access format of value. With particular reference to the operator 304, its access format of v-id means that, inside the operator 304, v-id is needed to execute the operation. However, this does not necessarily mean that the input to the operator 304 is of v-id or the output of the operator 304 is v-id. Instead, it can occur that the operator can have its input and output both as doc-id, for example, and convert doc-id into v-id only internally (i.e., inside the operator 304) and discard the converted values without storing the converted values to memory (referred to as materialization, discussed in further detail herein).

In further detail, for any SELECT query, the base tables (i.e., one or more tables that are to be queried) are identified by table names and values of fields are provided by respective doc-ids. However, query results are to be provided in the value format, so the query results can be understood (e.g., by the user that submitted the query). Consequently, during the query processing, the database system converts doc-ids into values, as noted above. More specifically, for each conversion, the database system needs to decompress the internal data structures (e.g., as depicted in FIG. 2), which consumes technical resources of the database system and slows query execution time.

Again, it can be noted that at least two data format conversions are required and include converting doc-id to v-id and converting v-id to value. For each conversion a conversion cost is provided and can be described as the cost for processing each conversion. That is, the amount of processing power required to execute each conversion. Because each internal data structure is highly optimized with several compression strategies, conversion cost could be significant. Further, in executing the conversions, materialization is required and refers to writing data (e.g., doc-id, v-id, value) of the field(s) of the table(s) into memory. Accordingly, a materialization cost can be provided and is the cost for writing data into memory.

As noted above, each operator within a query plan has a respective access format, which indicates the data format that the operator uses to perform its operation. Typically, a query contains multiple types of operators. Example types of operators include JOIN, GROUP BY, UNION, among numerous other operators. Each operator can define its own data format for its output. In the example query plan 300 of FIG. 3, each number (e.g., 100, 10, 1000) represents output rows of each operator, as noted above. In this example, a simplistic decision would suggest that conversion and materialization should be taken between the operator 304 and the operator 306, because its output row number is the least. However, in reality, there are more factors to be considered.

In view of the above context, implementations of the present disclosure provide for optimizing output data formats to improve query processing. More particularly, implementations of the present disclosure provide per-field conversion cost and materialization cost calculations for query plans to determine a location along a query plan, at which a data format is to be converted.

In accordance with implementations of the present disclosure, for each field of a table that is to be queried by a query plan, an optimal output data format is determined for each operator in a set of operators (e.g., $O \rightarrow [o_1, \ldots, o_m]$, where m is the number of operators). The operators, for which an optimal output data format is to be determined can be referred to as target operators. The target operators are located along a path of the query plan between a field producer and a final consumer.

In some implementations, a top-down cost calculation is executed for each operator of a respective field. For example, a query can implicate multiple fields of a table or multiple tables. The cost calculation of the present disclosure is performed on a per-field basis. In some examples, the cost is calculated based on the following example relationship:

$$C_{o_i}[T_q] = C_{con}[T_q \rightarrow AT_{o_i}] * E_{o_i} +$$
$$\text{MIN}[C_{i+1}[T_1] + (C_{con}[T_q \rightarrow T_1] + C_{mat}[T_1]) * O_{o_i},$$
$$C_{i+1}[T_2] + (C_{con}[T_q \rightarrow T_2] + C_{mat}[T_2]) * O_{o_i},$$
$$\ldots C_{i+1}[T_n] + (C_{con}[T_q \rightarrow T_n] + C_{mat}[T_n]) * O_{o_i}]$$

where i is a counter that counts down from m to 1, T is a set of data formats (e.g., $T \rightarrow [T_1, \ldots, T_n]$, where n is the number of data formats), q is a counter from 1, ... n, $C_{con}$ a conversion cost for conversion from a first data format to a second data format, AT is an access format of a respective operator i ($o_i$), $C_{mat}$ is the materialization cost for a respective data format, E is an evaluation count of a respective operator ($o_i$) (e.g., the number of records the operator is to process), and O is an output count of a respective operator i ($o_i$) (e.g., the number of records the operator outputs). In some examples, the conversion cost $C_{con}$ accounts for multiple conversions. For example, converting doc-id to v-id then converting v-id to value. In this example, $C_{con}$ accounts for both conversions (e.g., if cost for doc-id to v-id is 1 and cost for v-id to value is 2, $C_{con}$=3). In some examples, this is also the case for materialization cost.

In general, $C_{o_i}[T_q]$ represents the cost of all operators $O_x$ where x≥i. In other words, $C_{o_i}[T_q]$ represents the cost of the operator $o_i$ and all ancestors of $o_i$ under the assumption that $o_i$ gets input data as $T_q$ format.

In further detail, the above relationship calculates the cost for an $i^{th}$ operator based on a data format ($T_q$) output from a child operator. More particularly, for the $i^{th}$ operator, a set of costs is determined, each cost in the set of costs corresponding to a respective data format. For example, and as noted above, data formats can include doc-id, v-id, and value. In this example, the set of data formats T includes $T_1$=doc-id, $T_2$=v-id, $T_3$=value (i.e., n=3). Continuing with this example, the set of costs for the $i^{th}$ operator would include $C_{o_i}[T_1]$, $C_{o_i}[T_2]$, $C_{o_i}[T_3]$.

In the example relationship above, a first segment ($C_{con}[T_q \rightarrow AT_{o_i}] * E_{o_i}$) is the cost for the $i^{th}$ operator ($o_i$) to convert the received data format to its access format. The first segment can be referred to as a self-cost (e.g., the cost the operator would expend to convert formats). If the received data format is the same as the access format, no conversion need be performed, and the first segment is zero. A second segment is the minimum cost for the parent ($o_{i+1}$) of the $i^{th}$ operator to convert records output based on conversion of each of the data formats. That is, a cost is calculated for each of the data formats and the minimum cost is selected as the cost value for the second segment. The second segment can be referred to as an ancestor-cost, because the value of the second segment is accumulated from the top-down (i.e., based on all ancestors of $o_i$, if any).

In some examples, a first data format cannot be converted to a second data format. For example, value cannot be converted to doc-id. In such instances, the conversion cost is set to infinity (INF), as discussed in further detail herein by way of non-limiting example.

In some examples, the conversion costs and materialization costs are provided as empirical values for the databases system. For example, data format conversions can be monitored and values respectively representative of conversion costs and materialization costs can be determined. In some examples, the conversions costs are provided as average conversion costs for data format conversions observed in the database system. In some examples, the materialization costs are provided as average materialization costs for data format conversions observed in the database system. In some examples, the conversion cost is a metric representative of a cost (e.g., in terms of processing power) to convert a record from a first data format to a second data format. In some examples, the materialization cost is a metric representative of a cost (e.g., in terms of processing power) to store a record as part of converting a record from the first data format to the second data format.

In accordance with implementations of the present disclosure, after the set of costs has been determined for each operator along a query plan for a respective field, conversion points are identified. When the query plan is executed, data formats are converted at the conversion points. In some examples, multiple conversion points are determined. For example, a first conversion point is provided for converting doc-id to v-id, and a second conversion point is provided for converting v-id to value. As described in further detail herein, the conversion points are selected to minimize the costs, in terms of both conversion costs and materialization cost, on the database system in executing the query plan.

Figure 4A:
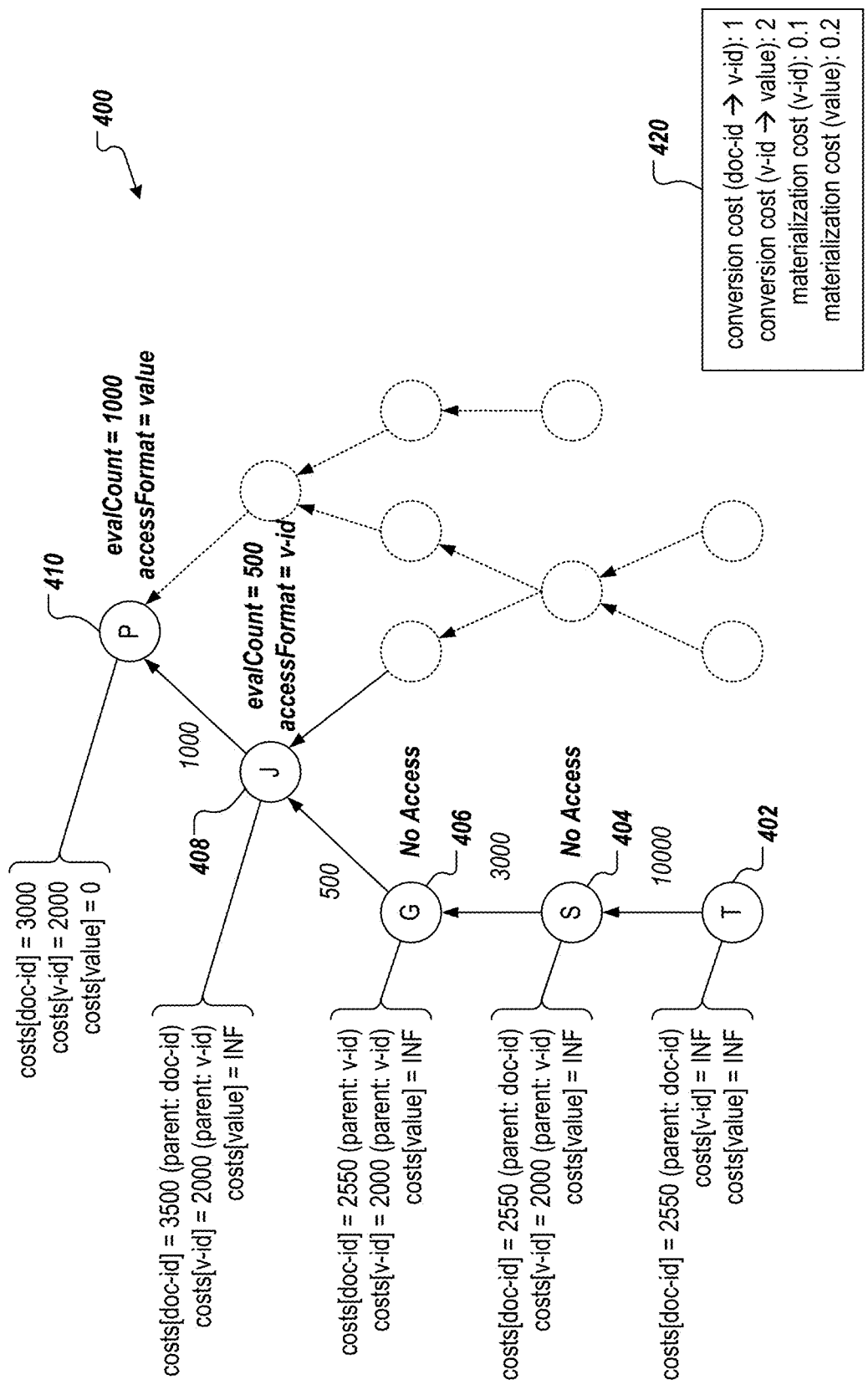
FIGS. 4A and 4B depicts a graphical representation for optimizing output data formats to improve query performance in accordance with implementations of the present disclosure.
Figure 4B:
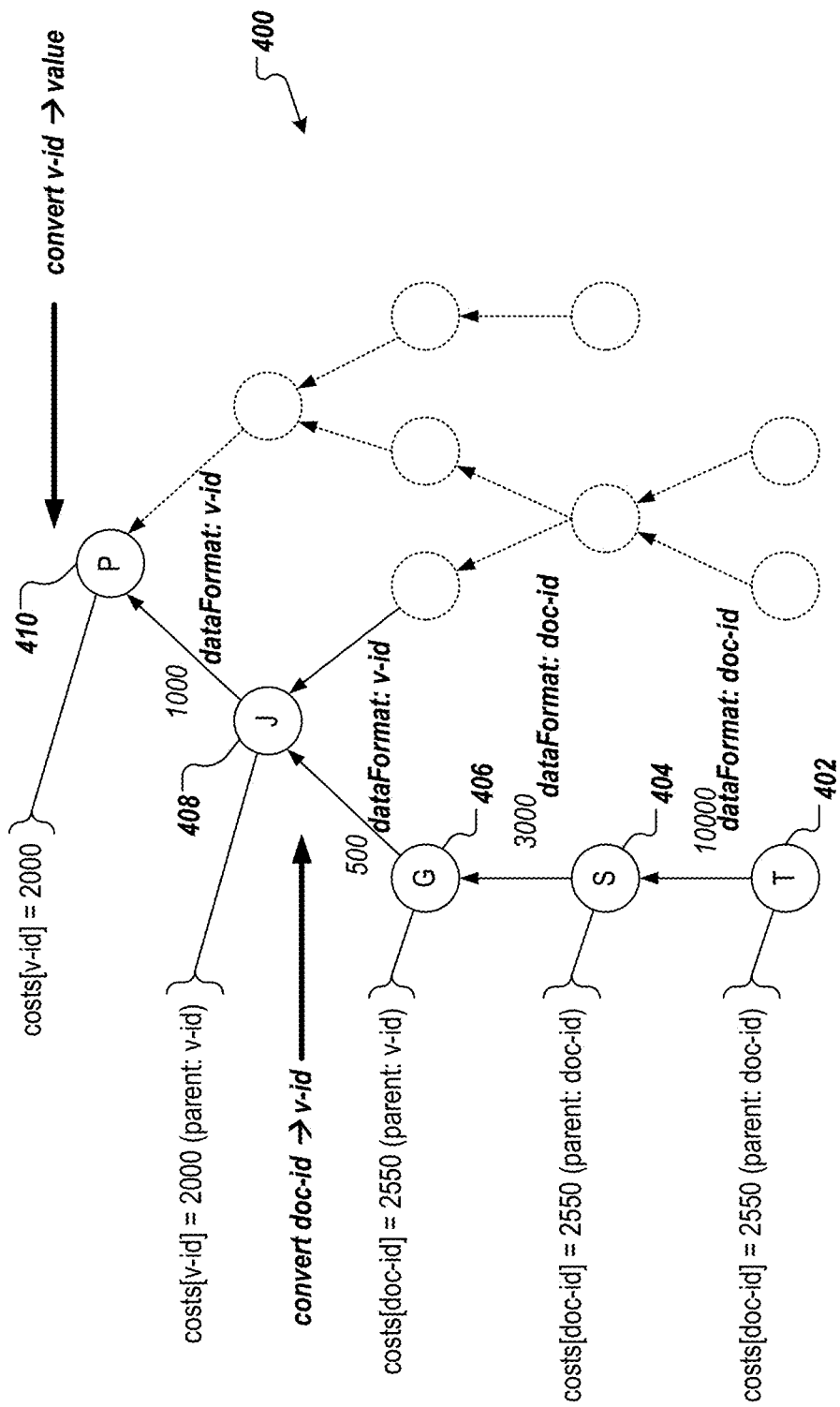

Implementations of the present disclosure are described in further detail herein by reference to a non-limiting example discussed with reference to FIGS. 4A and 4B. FIGS. 4A and 4B depicts a graphical representation for optimizing output data formats to improve query performance in accordance with implementations of the present disclosure.

In FIGS. 4A and 4B, a query plan 400 is depicted. In some examples, the query plan 400 is generated by a query execution engine based on a query received by a database system (e.g., a query submitted by a client). The query plan 400 includes nodes and edges between nodes, each node representing an operator. In the example of FIGS. 4A and 4B, the query plan 400 includes multiple paths, each path extending from a leaf node to a root node. In some examples, and as described in further detail herein, each leaf node accesses a field of a table. In some examples, the query plan 400 can access data from a table or multiple tables.

In the example of FIGS. 4A and 4B, a path includes operators 402, 404, 406, 408, 410 (e.g., a set of operators O, where $o_1$=operator 402 ($o_{402}$), $o_2$=operator 404 ($o_{404}$), $o_3$=operator 406 ($o_{406}$), $o_4$=operator 408 ($o_{408}$), $o_5$=operator 410 ($o_{410}$)). In some examples, the operator 402 (depicted as a leaf node) access data stored in a field of a table (e.g., as defined in the query), and the operator 410 (depicted as a root node 410) provides a query result. The operators 404, 406, 408 (depicted as intermediate nodes) provide intermediate results as data is processed along the path. In some examples, the data is accessed in a first data format (e.g., doc-id) and the query result is provided in a second data format (e.g., value).

By way of non-limiting example, the operator 402 is a table search operator, the operator 404 is a filter operator, the operator 406 is a group operator, the operator 408 is a join operator, and the operator 408 is a project operator. In the depicted example, the operator 402 provides an output count of 10,000 (e.g., $O_{402}$=10,000). This means that execution of the operator 402 results in 10,000 records read from the table for the field. The operator 404 has an evaluation count of 10,000 (e.g., $E_{404}$=$O_{402}$=10,000) and an output count of 3,000 (e.g., $O_{404}$=3,000). This means that execution of the operator 404 on the 10,000 records output by the operator 402 results in 3,000 records. The operator 406 has an evaluation count of 3,000 (e.g., $E_{406}$=$O_{404}$=3,000) and an output count of 500 (e.g., $O_{406}$=500). This means that execution of the operator 406 on the 3,000 records output by the operator 404 results in 3,000 records. The operator 408 has an evaluation count of 500 (e.g., $E_{408}$=$O_{406}$=500) and an output count of 1000 (e.g., $O_{408}$=1000). This means that execution of the operator 408 on the 500 records output by the operator 406 results in 1,000 records. The operator 408 has an evaluation count of 1000 (e.g., $E_{410}$=$O_{408}$=1000). In the example of FIGS. 4A and 4B, the operators 404, 406 do not have an access format, the operator 408 has an access format of v-id and the operator 410 has an access format of value.

In some examples, each of the output counts is estimated. That is, because the operators have not yet been executed, an estimation is performed to provide each of the output counts. Any appropriate estimation algorithm can be used to estimate the output counts.

In accordance with implementations of the present disclosure, a set of costs is calculated for each operator in the path, from the top down (i.e., from the root node to the leaf node). Consequently, a first set of costs is calculated for the operator 410, a second set of costs is calculated for the operator 408, a third set of costs is calculated for the operator 406, a fourth set of costs is calculated for the operator 404, and a fifth set of costs is calculated for the operator 402. The respective sets of costs are depicted in FIG. 4A, and each include a doc-id cost, a v-id cost, and a value cost. The costs in each set of costs are calculated based on the above-provided relationship using cost values 420 depicted in FIG. 4A.

The first set of costs (for the operator 410) is calculated first. In the example of FIG. 4A, the first set of costs includes a cost[doc-id] calculated as follows:

$$C_{o5}[\text{doc-id}]=(3)*1000=3000$$

a cost[v-id] calculated as follows:

$$C_{o5}[v\text{-id}]=(2)*1000=2000$$

and a cost[value] calculated as follows:

$$C_{o5}[\text{value}]=0$$

The costs in the first set of costs are each calculated only using the first segment, because the operator 410 does not have any parent. It can also be noted that, because the access format of the operator 410 is value, the cost[value] is 0 (i.e., no conversion need be performed).

The second set of costs (for the operator 408) is calculated next. In the example of FIG. 4A, the second set of costs includes a cost[doc-id] calculated as follows:

$$C_{o4}[\text{doc-id}]=(1)*500+\text{MIN}[3000,3100,3200]=3500$$

a cost[v-id] calculated as follows:

$$C_{o4}[v\text{-id}]=(0)*500+\text{MIN}[\text{INF},2000,2200]=2000$$

and a cost[value] calculated as follows:

$$C_{o4}[\text{value}]=\text{INF}$$

The costs in the second set of costs are each calculated using the first segment and the second segment, because the operator 408 has a parent (i.e., the operator 410). It can also be noted that the cost[value] is INF (i.e., there is no conversion possible from value to v-id.

Each of the third set of costs (for the operator 406), the fourth set of costs (for the operator 404), and the fifth set of costs (for the operator 402) are calculated as similarly described herein. With particular reference to the operator 402 (e.g., boundary operator, producer operator), however, because the operator 402 is the producer of the field (i.e., reads the field of the table), the original format, doc-id, is considered. This is why cost[v-id] and cost[value] are both INF.

With reference to FIG. 4B, locations along the path are identified for execution of format conversion based on the set of costs of each operator 402, 404, 406, 408, 410. In the example of FIG. 4B, it is determined that the conversion from doc-id to v-id should be executed between the operator 406 and the operator 408 and the conversion from v-id to value should be executed on the output of the operator 410.

In making the selection, the location that should be selected is already implied in the costs. More particularly, the implication made during the top-down calculation, when costs were calculated, a comparison between MIN [parent doc-id case, parent v-id case, parent value case] is performed (i.e., in the second segment). If the parent v-id case is selected as the cheapest case, then the implication has been made—this cost is made under the assumption that parent v-id case. For example, and with reference to FIG. 4A, cost[doc-id] for the operator 402 already has an implication that this cost comes from the parent doc-id. Consequently, the parent doc-id case is selected. For the operator 404, it's same, the parent doc-id case is selected. For the operator 406, cost[doc-id] implies the parent v-id case. Consequently, v-id is selected for the operator 408.

Figure 5:
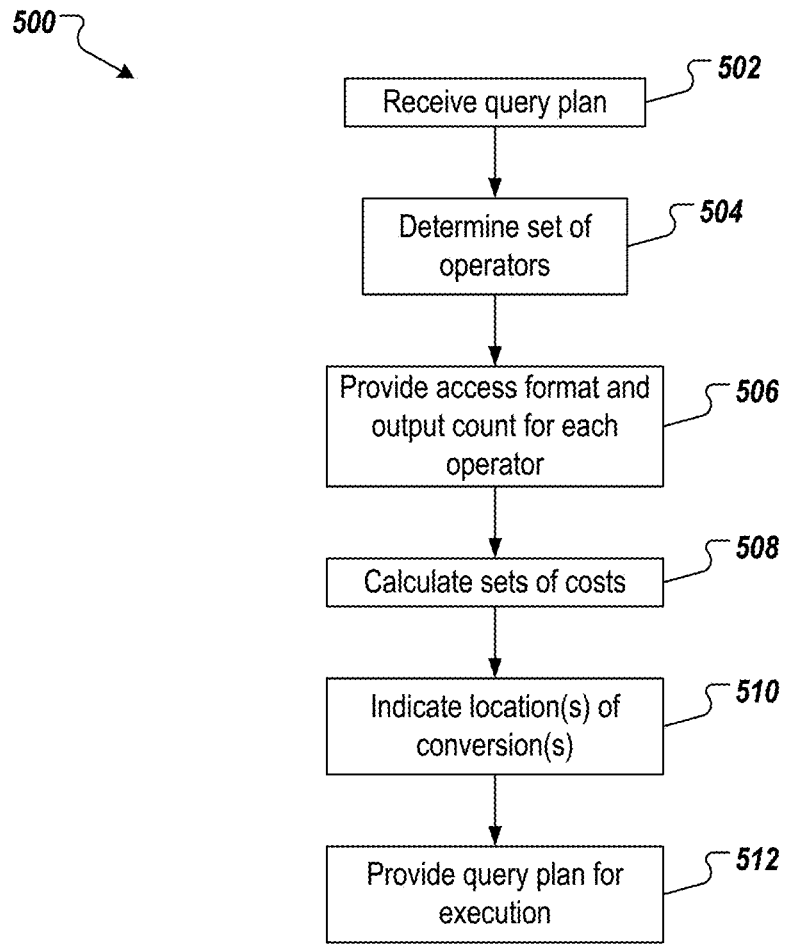
FIG. 5 is an example process that can be executed in accordance with implementations of the present disclosure.

FIG. 5 is an example process 500 that can be executed in accordance with implementations of the present disclosure. In some examples, the example process 500 is provided using one or more computer-executable programs executed by one or more computing devices.

A query plan is received (502). For example, and as described herein, a database system can receive a query from a client (e.g., the execution engine 120 of FIG. 1 receives the query), the query provided as one or more query statements (e.g., SQL statements). The query is processed by a query plan generator (e.g., the query plan generator 122 of FIG. 1), which provides the query plan. In some examples, a query plan optimizer (e.g., the query plan optimizer 124 of FIG. 1) receives the query plan.

A set of operators is determined (504). For example, for each field of one or more tables accessed by the query plan, a set of operators is determined (e.g., by the query plan optimizer 124). The set of operators defines a path within the query plan from a leaf node to a root node. Using the example of FIGS. 4A and 4B, the set of operators (path) includes operators 402, 404, 406, 408, 410 (e.g., a set of operators O, where $o_1$=operator 402 ($o_{402}$), $o_2$=operator 404 ($o_{404}$), $o_3$=operator 406 ($o_{406}$), $o_4$=operator 408 ($o_{408}$), $o_5$=operator 410 ($o_{410}$)).

Access formats and output counts are provided (506). For example, and as described herein, each operator in the set of operators includes an access format. In some examples, the access format is determined from a definition of a respective operator. In some examples, output counts are provided as estimated output counts. For example, an output count can be provided for each operator from an estimator algorithm.

Sets of costs are calculated (508). For example, for each operator in the set of operators, a set of costs is calculated, as described herein. As also described herein, the sets of costs are calculated using a top-down approach, in which the sets of costs are calculated beginning with a root node (top-most operator) to a leaf node (bottom-most operator). In accordance with implementations of the present disclosure, each cost in a set of costs is determined based on a first segment and a second segment. The first segment (self-cost segment) represents the cost of a currently considered operator (the $i^{th}$ operator ($o_i$)) to convert the received data format to its access format. The first segment can be referred to as a self-cost (e.g., the cost the operator would expend to convert formats). If the received data format is the same as the access format, no conversion need be performed, and the first segment is zero. The second segment (parent-cost) is the minimum cost for the parent of the currently considered operator (the $i+1^{th}$ ($o_{i+1}$)) to convert records output based on conversion of each of the data formats. That is, a cost is calculated for each of the data formats and the minimum cost is selected as the cost value for the second segment, as described in detail herein.

Locations of conversions are indicated (510). For example, for each conversion of a data format, a location along the path is selected, each location being between operators in the set of operators. As described herein, the locations are selected based on the sets of costs, where a minimum cost indicates an optimized location for execution of a data format conversion. The query plan is provided for execution (512). For example, the query plan, with location indications, is provided to the query executor 126 of FIG. 1 by the query plan optimizer 124 for execution.

Implementations of the present disclosure achieve one or more of the following example advantages. Implementations of the present disclosure enable optimized selection of locations for conversion of data formats along a path through a query plan on a per-field basis (i.e., each field of a table accessed by the query plan). In this manner, technical resources of the database system are conserved. That is, by executing conversions of data formats at locations selected in accordance with implementations of the present disclosure, less processing power and memory are used as compared to executing the conversions at other locations.

Figure 6:
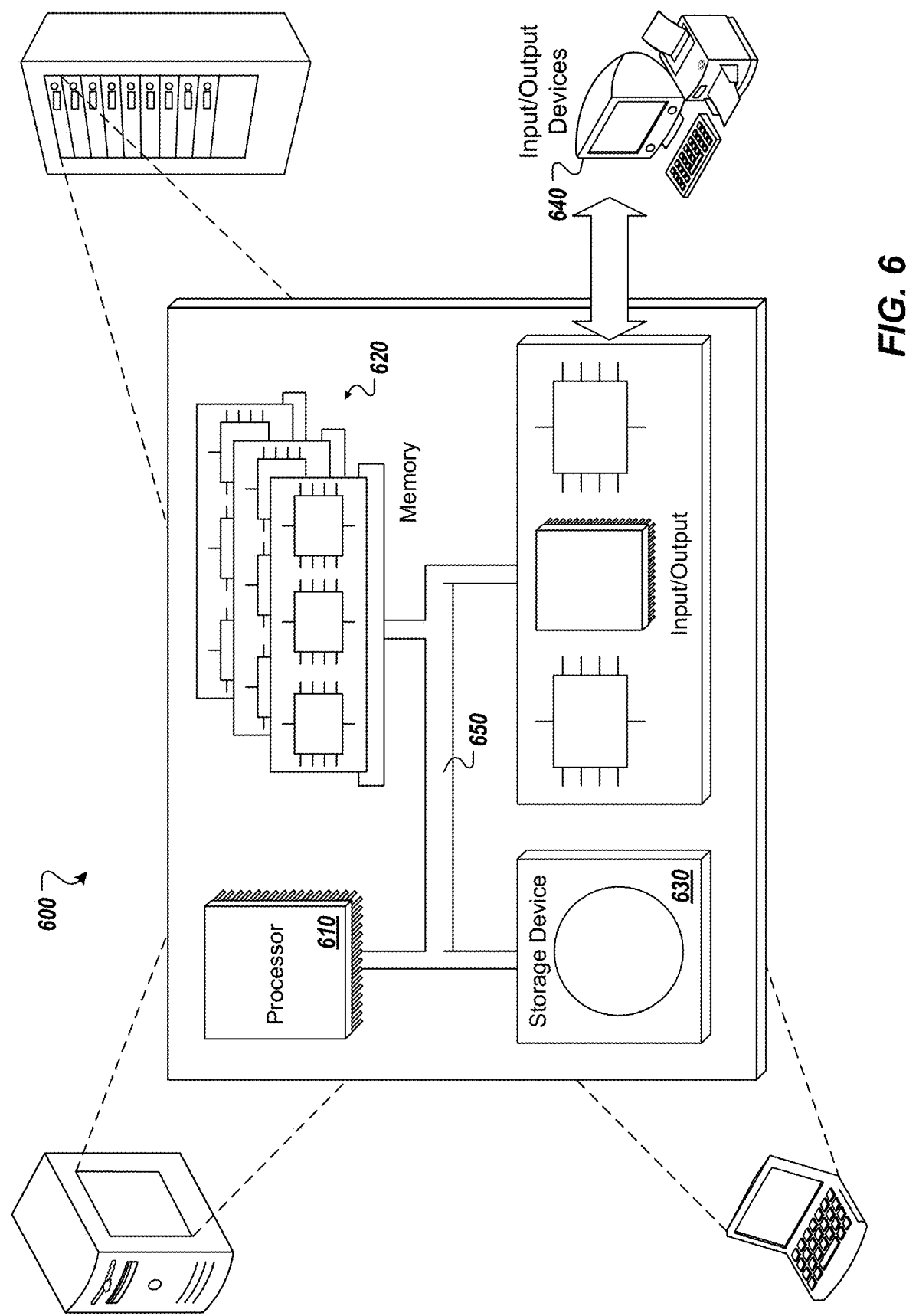
FIG. 6 is a schematic illustration of example computer systems that can be used to execute implementations of the present disclosure.

Referring now to FIG. 6, a schematic diagram of an example computing system 600 is provided. The system 600 can be used for the operations described in association with the implementations described herein. For example, the system 600 may be included in any or all of the server components discussed herein. The system 600 includes a processor 610, a memory 620, a storage device 630, and an input/output device 640. The components 610, 620, 630, 640 are interconnected using a system bus 650. The processor 610 is capable of processing instructions for execution within the system 600. In some implementations, the processor 610 is a single-threaded processor. In some implementations, the processor 610 is a multi-threaded processor. The processor 610 is capable of processing instructions stored in the memory 620 or on the storage device 630 to display graphical information for a user interface on the input/output device 640.

The memory 620 stores information within the system 600. In some implementations, the memory 620 is a computer-readable medium. In some implementations, the memory 620 is a volatile memory unit. In some implementations, the memory 620 is a non-volatile memory unit. The storage device 630 is capable of providing mass storage for the system 600. In some implementations, the storage device 630 is a computer-readable medium. In some implementations, the storage device 630 may be a floppy disk device, a hard disk device, an optical disk device, or a tape device. The input/output device 640 provides input/output operations for the system 600. In some implementations, the input/output device 640 includes a keyboard and/or pointing device. In some implementations, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for optimizing execution of a query plan within a database system, the method being executed by one or more processors and comprising:
   receiving a query plan, the query plan comprising at least one set of operators defining a path within the query plan from a leaf node to a root node, each node on the path being representative of an operator in the at least one set of operators, the path corresponding to a field of a table stored within the database system;
   providing, an access format and an output count for each operator in the set of operators, the output count of each operator being an estimated number of records output by the operator;
   calculating, for each operator in the set of operators, a set of costs based on the access format and the output count of each operator in the set of operators, the set of costs being calculated beginning with the root node to the leaf node, each cost in the set of costs associated with a data format in a set of data formats, each cost comprising a first segment and a second segment, the first segment indicating a cost of a respective operator to convert an incoming data format to the access format of the respective operator, the second segment indicating a cost based on a set of costs of a parent operator of the respective operator, a conversion cost, and a materialization cost that represents processing power required to store a data record as part of converting the data record from the incoming data format to another data format;
   indicating, along the path within the query plan, a first location representing execution of a conversion from a first data format to a second data format, the first location being between a pair of operators selected based on the sets of costs; and
   providing the query plan with first location for execution to generate a query result, wherein during execution of the query plan, conversion of data from the first data format to the second data format occurs at the first location.

2. The method of claim 1, wherein the conversion cost represents processing power expended to convert a data record from the incoming data format to another data format.

3. The method of claim 1, wherein the set of operators comprises an order of operators comprising an output operator that provides the query result and an input operator that reads data from the field of the table, the output operator being a first operator in the order of operators and the input operator being a last operator in the order of operators, and calculating the sets of costs begins with the output operator and ends with the input operator.

4. The method of claim 1, wherein each of the conversion costs and the materialization costs are provided as empirical values determined for the database system.

5. The method of claim 1, further comprising indicating a second location representing execution of a conversion from the second data format to a third data format.

6. The method of claim 5, wherein the second location is after an output operator of the set of operators.

7. A non-transitory computer-readable storage medium coupled to one or more processors and having instructions stored thereon which, when executed by the one or more processors, cause the one or more processors to perform operations for optimizing execution of a query plan within a database system, the operations comprising:
   receiving a query plan, the query plan comprising at least one set of operators defining a path within the query plan from a leaf node to a root node, each node on the path being representative of an operator in the at least one set of operators, the path corresponding to a field of a table stored within the database system;

providing, an access format and an output count for each operator in the set of operators, the output count of each operator being an estimated number of records output by the operator;

calculating, for each operator in the set of operators, a set of costs based on the access format and the output count of each operator in the set of operators, the set of costs being calculated beginning with the root node to the leaf node, each cost in the set of costs associated with a data format in a set of data formats, each cost comprising a first segment and a second segment, the first segment indicating a cost of a respective operator to convert an incoming data format to the access format of the respective operator, the second segment indicating a cost based on a set of costs of a parent operator of the respective operator, a conversion cost, and a materialization cost that represents processing power required to store a data record as part of converting the data record from the incoming data format to another data format;

indicating, along the path within the query plan, a first location representing execution of a conversion from a first data format to a second data format, the first location being between a pair of operators selected based on the sets of costs; and providing the query plan with first location for execution to generate a query result, wherein during execution of the query plan, conversion of data from the first data format to the second data format occurs at the first location.

8. The computer-readable storage medium of claim 7, wherein the conversion cost represents processing power expended to convert a data record from the incoming data format to another data format.

9. The computer-readable storage medium of claim 7, wherein the set of operators comprises an order of operators comprising an output operator that provides the query result and an input operator that reads data from the field of the table, the output operator being a first operator in the order of operators and the input operator being a last operator in the order of operators, and calculating the sets of costs begins with the output operator and ends with the input operator.

10. The computer-readable storage medium of claim 7, wherein each of the conversion costs and the materialization costs are provided as empirical values determined for the database system.

11. The computer-readable storage medium of claim 7, wherein operations further comprise indicating a second location representing execution of a conversion from the second data format to a third data format.

12. The computer-readable storage medium of claim 11, wherein the second location is after an output operator of the set of operators.

13. A system, comprising:
a computing device; and
a computer-readable storage device coupled to the computing device and having instructions stored thereon which, when executed by the computing device, cause the computing device to perform operations for optimizing execution of a query plan within a database system, the operations comprising:

receiving a query plan, the query plan comprising at least one set of operators defining a path within the query plan from a leaf node to a root node, each node on the path being representative of an operator in the at least one set of operators, the path corresponding to a field of a table stored within the database system;

providing, an access format and an output count for each operator in the set of operators, the output count of each operator being an estimated number of records output by the operator;

calculating, for each operator in the set of operators, a set of costs based on the access format and the output count of each operator in the set of operators, the set of costs being calculated beginning with the root node to the leaf node, each cost in the set of costs associated with a data format in a set of data formats, each cost comprising a first segment and a second segment, the first segment indicating a cost of a respective operator to convert an incoming data format to the access format of the respective operator, the second segment indicating a cost based on a set of costs of a parent operator of the respective operator, a conversion cost, and a materialization cost that represents processing power required to store a data record as part of converting the data record from the incoming data format to another data format;

indicating, along the path within the query plan, a first location representing execution of a conversion from a first data format to a second data format, the first location being between a pair of operators selected based on the sets of costs; and providing the query plan with first location for execution to generate a query result, wherein during execution of the query plan, conversion of data from the first data format to the second data format occurs at the first location.

14. The system of claim 13, wherein the conversion cost represents processing power expended to convert a data record from the incoming data format to another data format.

15. The system of claim 13, wherein the set of operators comprises an order of operators comprising an output operator that provides the query result and an input operator that reads data from the field of the table, the output operator being a first operator in the order of operators and the input operator being a last operator in the order of operators, and calculating the sets of costs begins with the output operator and ends with the input operator.

16. The system of claim 13, wherein each of the conversion costs and the materialization costs are provided as empirical values determined for the database system.

17. The system of claim 13, wherein operations further comprise indicating a second location representing execution of a conversion from the second data format to a third data format.

* * * * *